United States Patent [19]

Schulha

[11] Patent Number: 5,654,740

[45] Date of Patent: Aug. 5, 1997

[54] PORTABLE COMPUTER INTEGRATED POWER SUPPLY AND POINTING DEVICE

[75] Inventor: Lesia S. Schulha, Holmes Beach, Fla.

[73] Assignee: Pavlo Bobrek, Holmes Beach, Fla.

[21] Appl. No.: 702,750

[22] Filed: Aug. 23, 1996

[51] Int. Cl.⁶ ..................................................... G09G 5/08
[52] U.S. Cl. .......................... 345/156; 345/157; 345/163
[58] Field of Search ..................................... 345/156, 157, 345/158, 161, 163, 179; 364/709.01, 709.09

[56] References Cited

U.S. PATENT DOCUMENTS

| | | | |
|---|---|---|---|
| 4,578,674 | 3/1986 | Baker et al. | 345/159 |
| 4,654,648 | 3/1987 | Herrington et al. | 345/179 |
| 5,459,489 | 10/1995 | Redford | 345/158 |
| 5,461,204 | 10/1995 | Makinwa et al. | 345/179 |

FOREIGN PATENT DOCUMENTS 000178805A  4/1986  European Pat. Off. ............... 345/165

Primary Examiner—Richard Hjerpe
Assistant Examiner—Ricardo Osorio

[57] ABSTRACT

A pointing device for a portable computer that is integrated into the same package as its power supply which may also be used as an auxiliary power supply for the portable computer. As a result of its use, a portable computer would be able to alternatively draw energy from an alternating current power source, its own direct current power source, or the direct current power source located in the housing of the present invention. As used herein, it is contemplated for the term pointing device to include, but not be limited to, cursor control means such as a mouse having a position tracking processor on its bottom and control buttons on its top; a position tracking processor having adjacent control buttons; a track ball having adjacent control buttons; a glide-point device having adjacent control buttons; a track pad having adjacent control buttons; an optical device using reflected fight sources to measure position or change in position of the cursor; a radio frequency device measuring position or change in position of the cursor depending on changes in phase of radio frequency carders and/or radio frequency modulation; an acoustical device measuring position or change in position of the cursor depending on changes in phase of acoustical carriers and/or acoustical modulation; and a wireless device measuring position or change in position of a cursor.

18 Claims, 2 Drawing Sheets

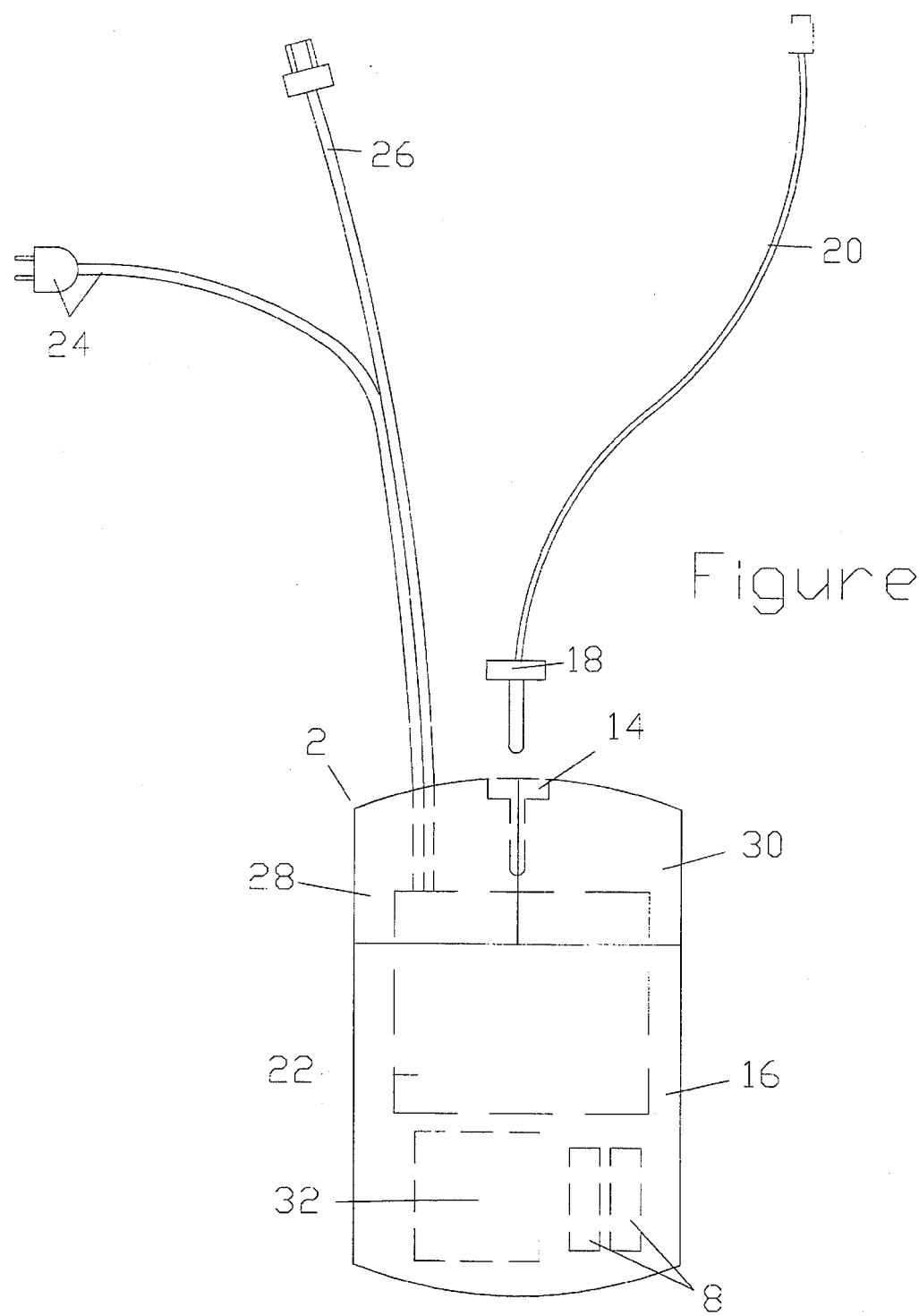

PORTABLE COMPUTER INTEGRATED POWER SUPPLY AND POINTING DEVICE

BACKGROUND

1. Field of Invention

This invention relates to the mechanical means used to affect the location of a cursor on a computer screen display, specifically to a pointing device for a portable computer that is integrated into the same package as its power supply which may also be used as an auxiliary power supply for the portable computer. As used herein, it is contemplated for the term pointing device to include, but not be limited to, cursor control means such as a mouse having a position tracking processor on its bottom and control buttons on its top; a position tracking processor having adjacent control buttons; a track ball having adjacent control buttons; a glide-point device having adjacent control buttons; a track pad having adjacent control buttons; an optical device using reflected light sources to measure position or change in position of the cursor; a radio frequency device measuring position or change in position of the cursor depending on changes in phase of radio frequency carders and/or radio frequency modulation; an acoustical device measuring position or change in position of the cursor depending on changes in phase of acoustical carriers and/or acoustical modulation; and a wireless device measuring position or change in position of a cursor.

2. Description of Prior Art

Portable computers are being carried with increasing frequency by people needing to store and compile information in places where battery-charging power supplies are unavailable. Personal computers are known to be commonly used in such diverse settings as libraries, vacation resort areas, airplanes, and motor vehicle race tracks where pit crews use them to monitor motor vehicle performance. Most portable computers have alternating current-direct current power supply converters which are contained in their own separate housing and which connect to an alternating current source and the portable computer via separate cords. The alternating current-direct current power supply converter is connected either to enable the portable computer to operate for an extended period of time or to charge batteries contained within the portable computer. The alternating current-direct current power supply converter is usually ported along with the portable computer whenever the period of use is expected to exceed the capacity of the portable computer's batteries. Further, a typical portable computer has a pointing device such as a track ball, glide point, or a track pad adjacent or attached to its keyboard. Such pointing devices are cumbersome to use because of their proximity to the keyboard. Therefore, many users prefer to carry and use a separate mouse, or other pointing device, which attaches to the portable computer using its own connection cord. Thus, in many situations, the portable computer user must carry both a pointing device and an alternating current-direct current power supply converter along with their attendant cords. By incorporating the pointing device into the same package as the alternating current-direct current power supply converter, the present invention obviates the need for a separate ergonomic pointing device such as a mouse to be ported in addition to the alternating current-direct current power supply converter.

Another limiting factor in the use of portable computers is the useful life of their batteries, which at best may only have the stored energy necessary for an hour or two of portable computer operation. People using a portable computer away from their office, school, or home for extended periods of time often require more than an hour or two of battery power. Purchasing multiple batteries for extended time away from a battery-charging power source is expensive and carrying a multitude of batteries is cumbersome.

Another limiting factor in the use of portable computers is the sometimes confining space within which portable computer users must work. Unless they pay first class airplane fares, people flying have only their lap, or a small pull-down tray on the seat back in from of them, on which to position a portable computer. People working at a vacation resort area may want to confine the space in which they use their portable computer in order to keep it free from damaging influences, such as the sun, sand, and water. Further, people using portable computers in crowded libraries and at race tracks may not have access to a battery-charging power source, nor a large uncluttered area in which to work. Therefore, each of these above-mentioned portable computer users would not have the work space within which to easily change portable computer batteries with the frequency that may be required for some portable computers, nor would such users typically be able to access a battery-charging power supply with the frequency needed to work exclusively from the stored energy in one rechargeable computer battery.

Other limiting factors in the use of portable computers are the difficulty some people find in using the small position tracking processors and mouse buttons incorporated therein and the frequency with which such position tracking processors must be disassembled so that the moving parts interfacing with the position tracking processor may be cleaned, for example with alcohol, to dislodge skin oils, dust, skin cells, hair, and other debris which commonly move beneath the position tracking processors of portable computers and prevent them from operating smoothly and efficiently. In vacation resort areas, on airplanes, or at race tracks, such position tracking processor cleaning would be nearly impossible to perform correctly. As a result the connection of an enlarged mouse accessory would make use of the portable computer easier, particularly if the enlarged mouse had an independent power supply which would not prematurely drain the energy stored in the batteries installed within the portable computer housing by having to power the enlarged mouse, and could also provide an auxiliary source of energy for the portable computer to which it is connected when the batteries in the portable computer become drained.

Prior art is known to include electronic remote control devices for televisions and other electronic devices, such as video recorders and video players, which have internal power supplies. U.S. Pat. No. 5,459,489 to Redford (1995) also discloses a hand held remote control device using infrared signals which houses its own power supply. One of the uses of the Redford invention is to replace a mouse in the control of a cursor on a computer screen display. However, neither the power supply in the electronic remote control devices, nor that in the Redford invention, is contemplated to provide an auxiliary source of power supply for the electronic devices with which each is to be used. It is not known to have a pointing device for a portable computer that is integrated into the same package as its power supply which may also be used as an auxiliary power supply for operation of the portable computer to which it is connected when the energy stored in the batteries of the portable computer have become drained.

SUMMARY OF INVENTION—OBJECTS AND ADVANTAGES

It is the primary object of this invention to provide a pointing device for a portable computer which is integrated into the same package serving as the alternating current-direct current power supply converter for the portable computer. Another object of this invention is to provide a pointing device for a portable computer which is integrated into the same package as a power storage device such as a battery serving as an auxiliary power supply for the portable computer to which it is connected. It is also an object of this invention to provide an integrated pointing and power supply device which is ergonomically configured to conform to the shape of a human hand for comfort and ease of use. A further object of this invention is to provide an integrated pointing and power supply device each function of which may be operable independently from the other. It is also an object of this invention to provide an integrated pointing and power supply device which is fully operational in the absence of alternating current line power.

As described herein, properly manufactured and used with a portable computer, the present invention would provide an auxiliary source of power for the portable computer during extended use away from a battery-charging power source. The pointing device of the present invention is not critical to it and may be selected from a variety of cursor controlling means including a mouse having a position tracking processor on its bottom and control buttons on its top; a position tracking processor having adjacent control buttons; a track ball having adjacent control buttons; a glide-point device having adjacent control buttons; a track pad having adjacent control buttons; an optical device using reflected light sources to measure position or change in position of the cursor; a radio frequency device measuring position or change in position of the cursor depending on changes in phase of radio frequency carriers and/or radio frequency modulation; an acoustical device measuring position or change in position of the cursor depending on changes in phase of acoustical carriers and/or acoustical modulation; or a wireless device measuring position or change in position of a cursor. The housing of the present invention is ergonomically configured to conform to the shape of a human hand for comfort and ease of use. During use the cursor controlling function of the present invention may be operated independently from its power supply function, and vice versa. Further, although the present invention has an alternating current cord and plug and may operate using an alternating current power source, the present invention has means for direct connection to the computer, as well as its own direct current power source, therefore it is fully operational in the absence of alternating current line power.

The description herein provides preferred embodiments of the present invention but should not be construed as limiting the scope of the integrated pointing device and power supply invention. Variations in the type of cursor control used, the size, number, and type of batteries used, the means used for converting power supply usage between alternating current and direct current sources, the type of female receptacle used on the pointing device for its connection directly to a portable computer, the type of antenna used, the length and location of the antenna within the pointing device housing, and the lengths of the various cords used for direct connection of the pointing device to the portable computer, direct current connection from the power supply of the pointing device to the portable computer, and connection of the pointing device to an alternating current power source, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 2 is a perspective view of a second preferred embodiment of the invention having a position tracking processor and means for directly connecting the pointing device to the portable computer.

DETAILED DESCRIPTION OF PREFERRED EMBODIMENTS

Figure 1:
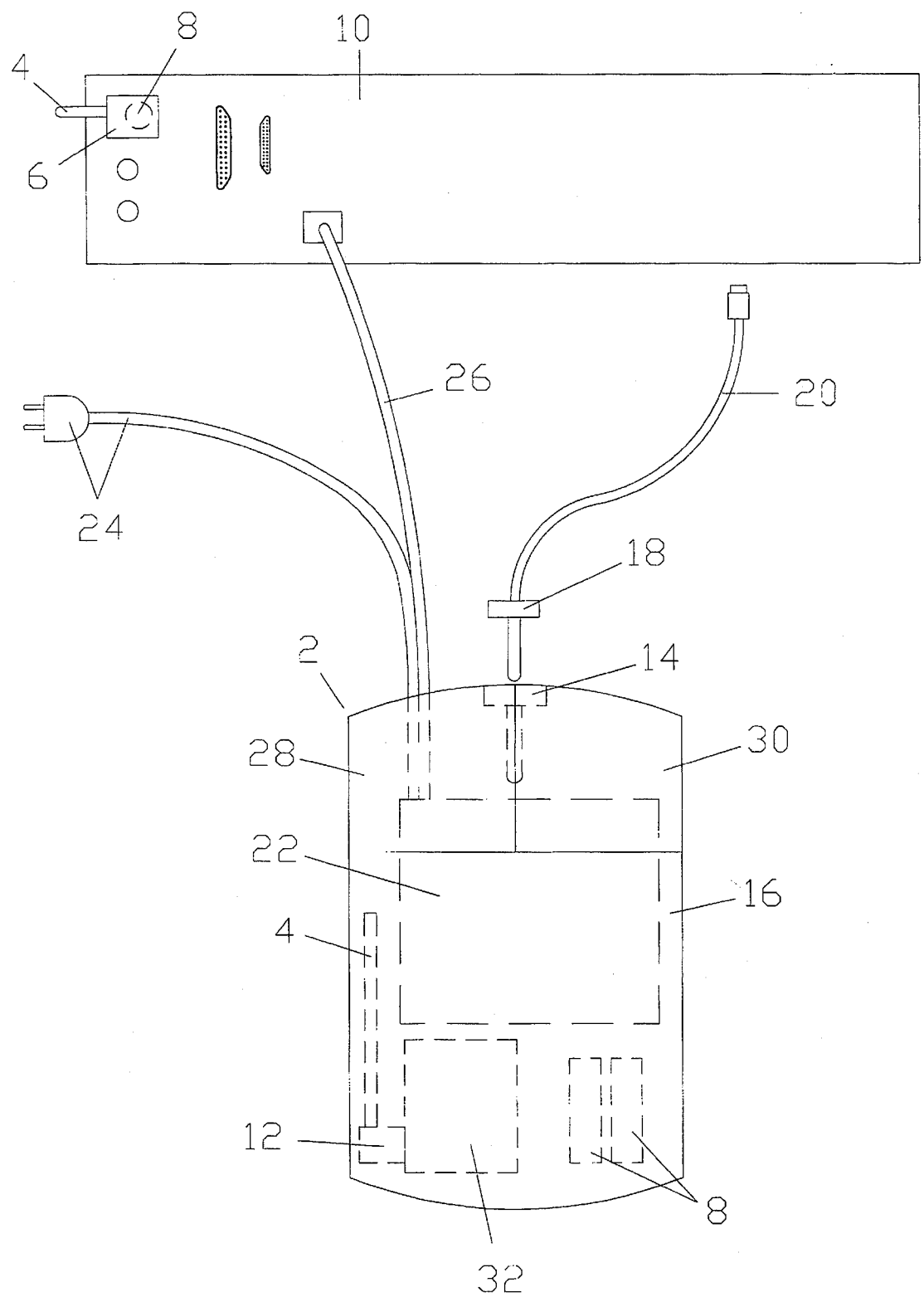
FIG. 1 is a perspective view of a first preferred embodiment of the pointing device of the invention having a radio frequency processor for control of a portable computer's cursor through detected changes in phase of radio frequency carriers and/or radio frequency modulation, a direct current power source for use in operating the pointing device and/or the portable computer to which it is connected, and a direct current connection so that the portable computer may use the direct current power source of the pointing device as an auxiliary power source.

FIG. 1 shows a first preferred embodiment of an integrated pointing device and power supply invention 2 having a housing 16 with a hollow interior and an outer surface having a left mouse control button 28 and a right mouse control button 30 positioned thereon. Although not shown, it is also contemplated for integrated pointing device and power supply invention 2 to have more than two such control buttons. It is contemplated for housing 16 to be ergonomically configured to conform to the shape of a human hand (not shown) for comfort and ease of use. Within housing 16 FIG. 1 shows integrated pointing device and power supply invention 2 having an antenna 4 attached to a radio frequency processor 12 and a position tracking processor 32, a direct current power source 8, an alternating current-direct current power supply converter 22, and a female receptacle 14. Although not shown alternating current-direct current power supply converter 22 is electrically connected to direct current power source 8. Direct current power source 8 may consist of rechargeable batteries which are charged by alternating current-direct current power supply converter 22. It should be noted that the use of direct current power source 8 is optional and that, in the absence of available power from direct current power source 8, integrated pointing device and power supply invention 2 will derive power through alternating current-direct current power supply converter 22. FIG. 1 also shows an alternating current cord and plug 24 and a direct current cord 26 each having one end extending through housing 16 and its other end connected to alternating current-direct current power supply converter 22. In FIG. 1, the end of direct current cord 26 extending through housing 16 is shown connected to a portable computer 10. FIG. 1 also shows a computer connection cord 20 having a male plug 18 on one of its ends for engagement with female receptacle 14, which is used to convey signals between position tracking processor 32 and portable computer 10 to effect the position of a cursor (not shown) on the display screen (not shown) of portable computer 10. FIG. 1 further shows portable computer 10 having direct current power source 8, antenna 4, and a radio frequency receiving unit 6. Although FIG. 1 shows male and female designated connections, it is contemplated in the present invention for any female designated connection to be male and for any male connection to instead comprise a female component.

FIG. 2 shows a second preferred embodiment of integrated pointing device and power supply invention 2 having housing 16 with left mouse control button 28 and right mouse control button 30 positioned thereon. FIG. 2 also shows self-contained position tracking processor 32, direct current power source 8, and alternating current-direct current power supply converter 22 being located within housing 16, with female receptacle 14 providing a direct portable computer connection means to housing 16. Although not shown, position tracking processor 32 is electrically connected to both leer mouse control button 28 and right mouse control button 30. In addition, FIG. 2 shows alternating current cord and plug 24 and direct current cord 26 each having one end extending through housing 16 with its other end connected to alternating current-direct current power supply converter 22. FIG. 2 also shows a computer connection cord 20 having a male plug 18 on one of its ends for engagement with female receptacle 14, which is used to convey signals between position tracking processor 32 and portable computer 10 to effect the position of a cursor (not shown) on the display screen (not shown) of portable computer 10.

The type of mechanism used to control the cursor (not shown) on the display screen (not shown) of portable computer 10 is not critical to integrated pointing device and power supply invention 2 and, although not shown, in addition to radio frequency processor 12 and position tracking processor 32 measuring position or change in position of the cursor (not shown), it is also contemplated by the present invention to have other types of cursor control mechanisms, including, but not limited to, a mouse having a track ball or other position tracking processor on its bottom and control buttons on its top; a track ball having adjacent control buttons; a glide-point device having adjacent control buttons; a track pad having adjacent control buttons; an optical device using reflected light sources to measure position or change in position of the cursor; an acoustical device measuring position or change in position of the cursor depending on changes in phase of acoustical carriers and/or acoustical modulation; and a wireless device measuring position or change in position of a cursor.

Further, the materials from which housing 16 are made are not critical to integrated pointing device and power supply invention 2. However, in the preferred embodiment housing 16 is made from rigid plastic to protect the components of the present invention located therein. Also, the type of energy storage means used for direct current power source 8 is not critical to integrated pointing device and power supply invention 2, as long as direct current power source 8 is small enough so that housing 16 remains ergonomically conformable to a human hand (not shown). In the preferred embodiment direct current power source 8 is in the form of rechargeable batteries, however, the number and storage capacity of each battery may be varied. The configuration of female receptacle 14, the size and location of antenna 4 within housing 16, the type of power converting means used for alternating current-direct current power supply converter 22, and the lengths of computer connection cord 20, alternating current cord and plug 24, and direct current cord 26 are not critical to integrated pointing device and power supply invention 2. It should be noted that in the present invention the type connectors is not critical and it is contemplated for the "male plug" and the "female receptacle" to be interchanged. Further, direct current cord 26 and computer connection cord 20, shown and described as separate cords herein for purposes of clarity, may be combined into a single cord by bundling together separate wires. The number of wires which are needed by the present invention may also be reduced by taking advantage of the different electrical and frequency characteristics of power supply and pointing device control signals.

There are several contemplated ways in which to use integrated pointing device and power supply invention 2. In one use of the first preferred embodiment having radio frequency processor 12, alternating current cord and plug 24 could be electrically connected to an alternating current power source (not shown) and direct current cord 26 could be electrically connected to portable computer 10 enabling portable computer 10 and integrated pointing device and power supply invention 2 to both draw energy from the alternating current power source for operation. During such use, the cursor (not shown) of portable computer 10 could be controlled by either radio frequency means or through use of computer connection cord 20. In another use of the first preferred embodiment, direct current cord 26 could be connected to portable computer 10 so that both portable computer 10 and integrated pointing device and power supply invention 2 could draw energy from direct current power source 8 on portable computer 10 or an alternating current power supply (not shown) connected to portable computer 10. During such use, the cursor (not shown) of portable computer 10 would be controlled through use of computer connection cord 20 and the radio frequency means of controlling the cursor would be by-passed. Another use of the first preferred embodiment of integrated pointing device and power supply invention 2 involves the connection of direct current cord 26 between alternating current-direct current power supply converter 22 and portable computer 10 so that both portable computer 10 and integrated pointing device and power supply invention 2 are able to draw energy from direct current power source 8 within housing 16. During this use, the cursor (not shown) of portable computer 10 could be controlled by either radio frequency means or through use of computer connection cord 20.

To use the second preferred embodiment having position tracking processor 32, the cursor (not shown) of portable computer 10 would be controlled through the use of computer connection cord 20. In one alternative use, alternating current cord and plug 24 could be electrically connected to an alternating current power source (not shown) and, through connection of direct current cord 26, portable computer 10 and integrated pointing device and power supply invention 2 could both draw energy from the alternating current power source for operation. In another alternative use, through the connection of direct current cord 26, both portable computer 10 and integrated pointing device and power supply invention 2 could draw energy from direct current power source 8 on portable computer 10 or an alternating current power supply (not shown) connected to portable computer 10. A third alternative use involves the connection of direct current cord 26 between alternating current-direct current power supply converter 22 and portable computer 10 so that both portable computer 10 and integrated pointing device and power supply invention 2 are able to draw energy from direct current power source 8 within housing 16.

What is claimed is:

1. An integrated pointing and power supply device for a portable computer having a cursor which is able to control said cursor and provide a power source accessible by said portable computer for operation of said portable computer, said integrated device comprising a housing having a hollow interior; a direct current power source positioned within said hollow interior; means for converting power supply usage between an alternating current power source and a direct current power source, said means for converting also positioned within said hollow interior and connected to said direct current power supply; means for controlling said cursor housed within said hollow interior; and a direct current power cord connected between said means for converting and said portable computer so that said portable computer is able to draw power from said direct current power source of said integrated device.

2. The integrated device of claim 1 wherein said means for controlling said cursor comprises a female receptacle connected through said housing and a computer connection cord having opposite ends, said computer connection cord having a male plug on one of said opposite ends, said male plug having a configuration for electrical connection to said female receptacle so that when said male plug is inserted into said female receptacle and the other of said opposite ends is connected to said portable computer, said cursor is controlled by said integrated device and said integrated device is able to obtain energy from said portable computer.

3. The integrated device of claim 1 wherein said housing has a bottom and a top and wherein said means for controlling said cursor comprises a position tracking processor movably attached to said bottom, and a plurality of control buttons positioned on said top, at least one of said control buttons comprising means for left mouse control and one of said control button comprising means for right mouse control.

4. The integrated device of claim 1 wherein said housing has a top and wherein said means for controlling said cursor comprises a position tracking processor movably attached on said top and a plurality of control buttons also positioned on said top, at least one of said control buttons comprising means for left mouse control and at least one of said control buttons comprising means for right mouse control.

5. The integrated device of claim 1 wherein said housing has a top and wherein said means for controlling said cursor comprises a glide-point movably attached on said top and a plurality of control buttons also positioned on said top, at least one of said control buttons comprising means for left mouse control and at least one of said control buttons comprising means for right mouse control.

6. The integrated device of claim 1 wherein said housing has a top and wherein said means for controlling said cursor comprises a track ball movably attached on said top and a plurality of control buttons also positioned on said top, at least one of said control buttons comprising means for left mouse control and at least one of said control buttons comprising means for fight mouse control.

7. The integrated device of claim 1 wherein said housing has a top and wherein said means for controlling said cursor comprises a track pad detachably connected on said top and a plurality of control buttons also positioned on said top, at least one of said control buttons comprising means for left mouse control and at least one of said control buttons comprising means for right mouse control.

8. The integrated device of claim 1 wherein said means for controlling said cursor is accomplished through changes in phase of radio frequency carriers and radio frequency modulation and comprises a radio frequency processor positioned within said housing, a first antenna connected to said radio frequency processor, a second antenna connected to said portable computer, and a radio frequency receiving unit connected to said portable computer.

9. The integrated device of claim 1 wherein said means for controlling said cursor comprises a plurality of optical devices using reflected light sources to measure position and change in position of said cursor.

10. The integrated device of claim 1 wherein said means for controlling said cursor comprises a plurality of acoustic devices depending on changes in phase of acoustical carders and acoustical modulation to measure position and change in position of said cursor.

11. The integrated device of claim 1 further comprising an alternating current cord and plug connected to said means for converting so that said integrated device is able to obtain power from both said direct current power source of said integrated device and said alternating current power source.

12. The integrated device of claim 11 wherein said housing has a bottom and a top and wherein said means for controlling said cursor comprises a position tracking processor movably attached to said bottom, and a plurality of control buttons positioned on said top, at least one of said control buttons comprising means for left mouse control and one of said control button comprising means for right mouse control.

13. The integrated device of claim 11 wherein said housing has a top and wherein said means for controlling said cursor comprises a position tracking processor movably attached on said top and a plurality of control buttons also positioned on said top, at least one of said control buttons comprising means for left mouse control and at least one of said control buttons comprising means for right mouse control.

14. The integrated device of claim 11 wherein said housing has a top and wherein said means for controlling said cursor comprises a glide-point movably attached on said top and a plurality of control buttons also positioned on said top, at least one of said control buttons comprising means for left mouse control and at least one of said control buttons comprising means for right mouse control.

15. The integrated device of claim 11 wherein said housing has a top and wherein said means for controlling said cursor comprises a track pad detachably connected on said top and a plurality of control buttons also positioned on said top, at least one of said control buttons comprising means for left mouse control and at least one of said control buttons comprising means for right mouse control.

16. The integrated device of claim 11 wherein said means for controlling said cursor is accomplished through changes in phase of radio frequency carriers and radio frequency modulation and comprises a radio frequency processor positioned within said housing, a first antenna connected to said radio frequency processor, a second antenna connected to said portable computer, and a radio frequency receiving unit connected to said portable computer.

17. The integrated device of claim 11 wherein said means for controlling said cursor comprises a plurality of optical devices using reflected light sources to measure position and change in position of said cursor.

18. The integrated device of claim 11 wherein said means for controlling said cursor comprises a plurality of acoustic devices depending on changes in phase of acoustical carders and acoustical modulation to measure position and change in position of said cursor.

* * * * *